3 Sheets--Sheet 1.
S. C. BAKER, J. ROOT, & E. J. CASE.
Improvement in Platform Weighing Scales.
No. 115,268.  *Fig. 1*  Patented May 30, 1871.
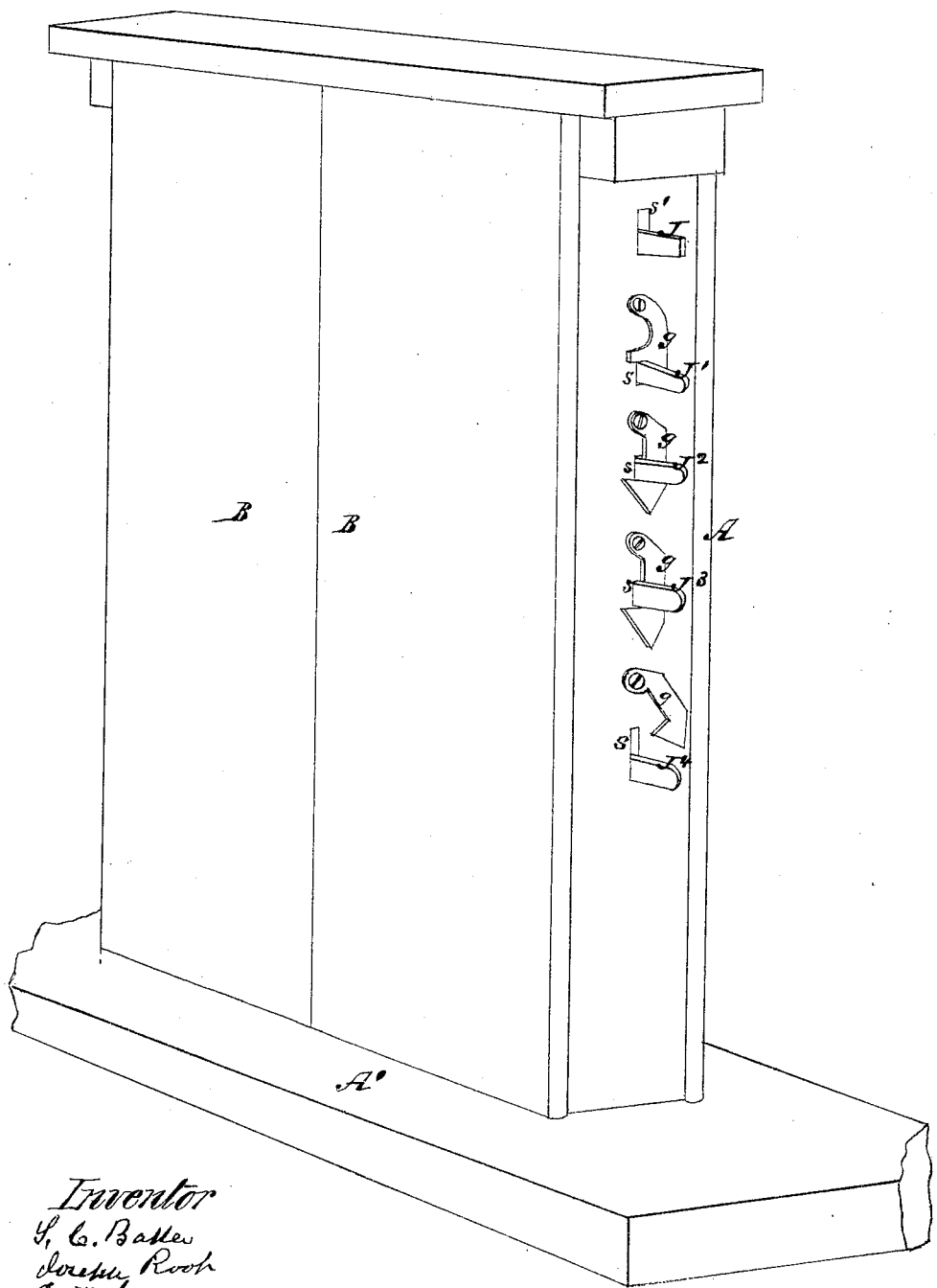

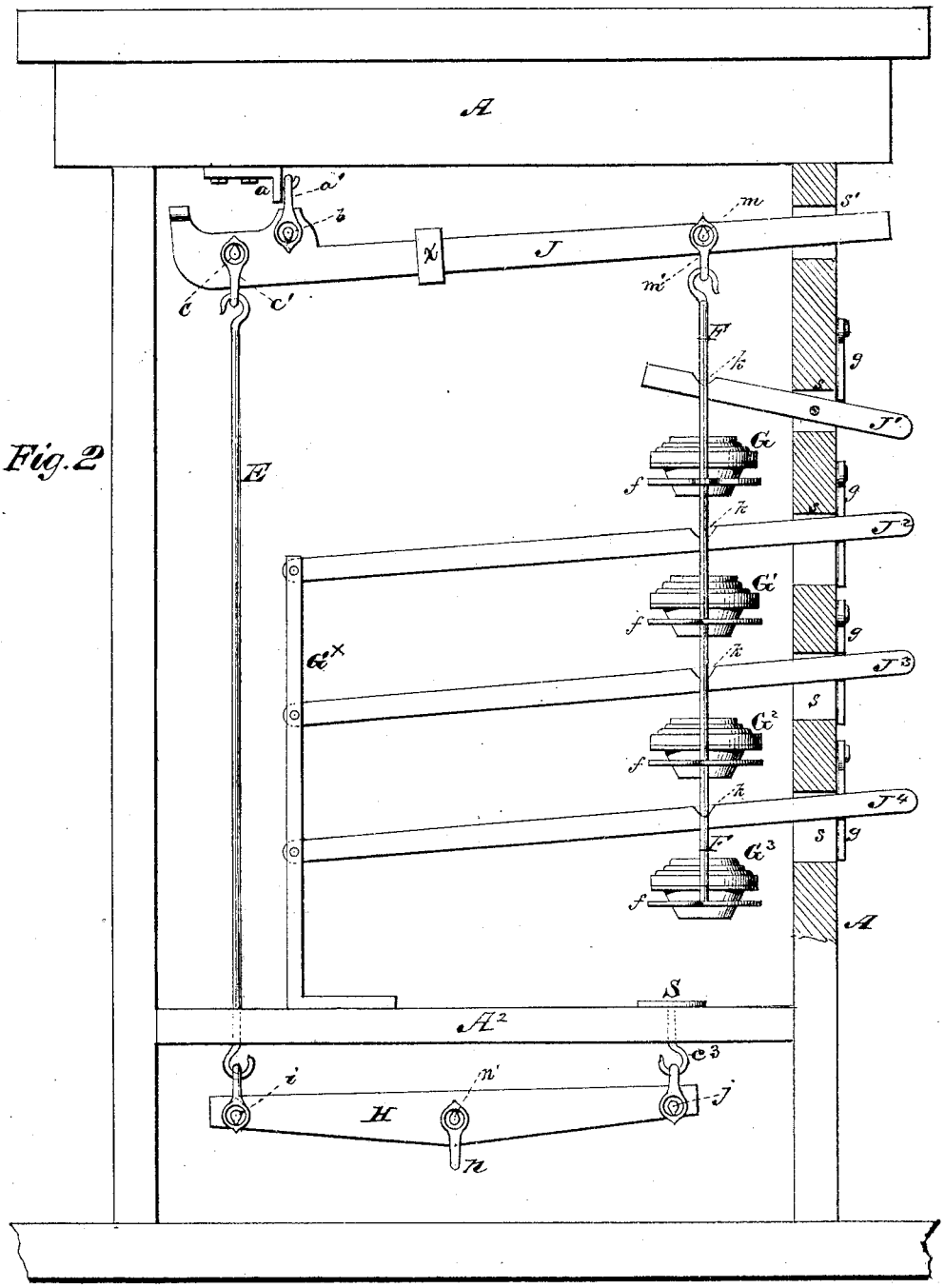

3 Sheets--Sheet 3.
S. C. BAKER, J. ROOT, & E. J. CASE.
Improvement in Platform Weighing Scales.
No. 115,268. Patented May 30, 1871.
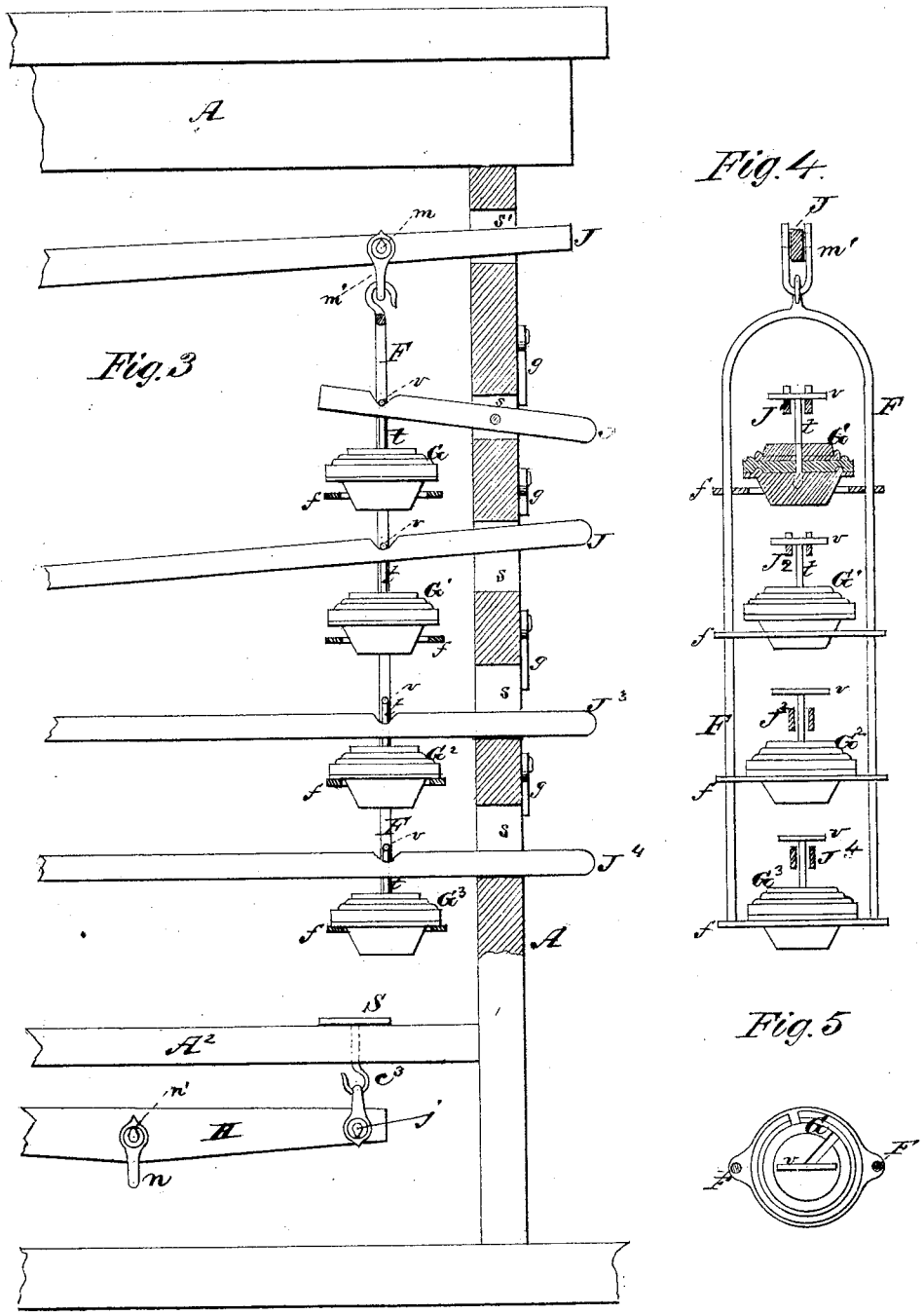
AM. PHOTO-LITHOGRAPHIC CO. N.Y. (OSBORNE'S PROCESS.)

UNITED STATES PATENT OFFICE.

SYLVESTER C. BAKER, OF ALTOONA, AND JOSEPH ROOT AND EMERSON J. CASE, OF YORK, PENNSYLVANIA.

IMPROVEMENT IN PLATFORM WEIGHING-SCALES.

Specification forming part of Letters Patent No. 115,268, dated May 30, 1871.

*To all whom it may concern:*

Be it known that we, SYLVESTER C. BAKER, of Altoona, in the county of Blair, and JOSEPH ROOT and EMERSON J. CASE, of York, in the county of York and State of Pennsylvania, have invented a new and useful Improvement in Weighing-Scales; and we do hereby declare that the following is a full, clear, and exact description thereof, reference being had to the accompanying drawing making part of this specification, in which—

Figure 1, Plate 1, is a perspective view of the case inclosing the improved weighing apparatus. Fig. 2, Plate 2, is a front elevation, partly in section, of the weighing apparatus and its case, as would be seen by a removal of the doors of the case. Fig. 3, Plate 3, is a front view, partly in section, indicating two of the weights transferred to the scale-beam. Fig. 4, Plate 3, is an end view of the weighing apparatus of Fig. 3, part of which is in section. Fig. 5 is a top view of one of the supplemental weights.

Similar letters of reference indicate corresponding parts in the several figures.

This invention relates to certain novel improvements which are applicable to platform-scales and other scales designed for weighing charges for furnaces, and for other purposes of weighing, wherein supplemental weights are so combined with a scale-beam that any one or more of them can be brought into operation at pleasure by a manipulation outside of the case containing the weighing apparatus.

The following description will enable others skilled in the art to understand our invention.

In the accompanying drawing, A represents a case of suitable capacity to contain the weighing apparatus, and B B are doors by which access can be obtained to the interior of the case when it is desired to adjust the sliding weight on the scale-beam. These doors will be provided with a lock, so that access to the weighing apparatus can only be obtained by the proper person. The scale-beam J is hung from a bracket, $a$, secured to the top of case A by means of a suspension-loop, $a'$, and knife-edge $b$. From a knife-edge, $c$, and loop $c^1$, on the shortest arm of the beam J, depends a rod, E, which supports one end of the platform-beam H by means of a loop and knife-edge $i$. The beam H is suspended at its opposite end from a movable hook, $c^3$, by means of a knife-edge and loop, $j$. The hook $c^3$ is secured to a plate, S, which lies on a horizontal partition, $A^2$. By means of a knife-edge, $n'$, and loop $n$, the beam H is connected to a platform in the usual well-known manner of constructing platform-scales. The scale-beam J is graduated and provided with a sliding weight, X. Thus far the apparatus is or may be constructed like an ordinary platform weighing-scale. The scale-beam J passes through a vertically-oblong slot, $s'$, which is made through one side of the case A, so that the movements of this beam can be observed from the outside of the case A while weighing; and near this exposed end of the beam J, but inside of case A, a long bail, F, is suspended by means of a loop, $m'$, and a knife-edge, $m$. The bail F has secured to it, at proper distances apart, a number of ring-shelves, $f$, for the purpose of receiving and supporting a corresponding number of weights, G $G^1$ $G^2$ $G^3$. Rising from the partition $A^2$ is a post, $G^\times$, to which three levers, $J^2$ $J^4$, are pivoted, the free ends of which pass through vertically-oblong slots $s$ made through one side of the case A, below the beam J. Above the lever $J^2$ is a short lever, $J^1$, which passes through a vertically-oblong hole made through one side of case A, and serves to support the weight G when this weight is not supported on its shelf $f$ of the bail F. Each one of the weight-supporting levers is notched at $k$ and opened laterally to receive the T-head $t$ $v$, which rises from the center of each weight. For the purpose of holding up the several weights free from the respective shelves $f$, buttons $g$ are applied outside of the case A in proper relation to their respective levers.

It will be seen from the above description that a person familiar with the interior construction and adjustments of the weighing apparatus can adjust any one or all of the weights, which are arranged within the bail F, according to the load to be weighed, and this he can do from the outside of the case. In Fig. 2 all the weights are represented as supported by their levers free from the scale-beam bail F, and in Figs. 3 and 4 two of the weights $G^2$ $G^3$ are represented as resting upon their respective shelves of the scale-beam bail. Thus it will be seen that different weights can be weighed on the same graduated scale-beam J attached to an ordinary platform-scale by simply adjusting one or more of the levers, the ends of which are exposed outside of the case A, so that the adjustments can be readily effected while the doors of the case A are locked.

We are aware of R. Eastman's patent of March 13, 1849, which was intended for a counter-scale, and is arranged to increase or diminish the weight on the weight-holder by means of a cone and slide-bar. In his there is but one weight-holder, and that is not combined with a platform-scale nor inclosed in a locked case. Our invention is so contrived as to be combined with a platform-scale and inclosed in a lock-case, so as to be a secret weigher, without which our invention would be of very slight value. We, however, do not claim the the discovery of a secret weigher, such having been in use heretofore. We have, instead of one weight-holder, several arms or holders, $f$, and instead of a cone and slide we have several bars, lifters, or levers, by means of which we throw into or out of use any of the sets of weights we may desire. Our plan differs in construction considerably from Eastman's, and in its operation. As will be seen from the following statement, it is totally different.

Operation of our Invention.

Suppose we want to fill into a blast-furnace what is termed a charge, consisting of, say, eight hundred and fifty pounds of coal, five hundred pounds of cold-short iron ore, one hundred and eighty pounds red-short iron ore, and two hundred and sixty pounds of limestone, each of which must be weighed separately; to accomplish which we first hoist out of use all of the weights with their holders, and balance the scale. Then we adjust weights on holders G to draw eight hundred and fifty pounds of coal, and by means of the lifter $J^1$ we drop it onto the platform or holder $f$, when the beam J will indicate when the correct weight of coal is placed on the platform of scale. We then hoist that set of weights out of use and adjust weights on $G^1$ to draw the five hundred pounds of cold-short iron, when that is dropped into its place by lifter $J''$ and the correct weight obtained by the indication of the beam, as above. We then go on with the other quality of ore and limestone in the same manner, using the two lower sets of weights and lifters. For the special use of our invention there will not be but one set of weights in use at the same time, nor twice in succession; but, while this is so, it is obvious that two or more of the weights might be combined by releasing two or more of the levers; but the important feature of our invention is a series of independently-acting weights combined with the scale-beam and platform in a locked case.

We are also aware of the patents granted to A. B. Davis, dated February 3, 1863, and March 31, 1868; but as both of these patents show organizations which require auxiliary graduated scale-beams to be combined with the main beam they differ from our invention, which employs but one graduated scale-beam, with which a series of independent weights is employed, said weights never resting upon said scale-beam unless they are in use for weighing a load; whereas, in at least one of the patents just named, the weights of the auxiliary graduated beams are always pulling down on the knife-edge of the main scale-beam. Besides this, the auxiliary scale-beams have to be constructed so as to swing on their own knife-edge bearings. Our scale is a great improvement on the plans cited in reference, and is much simpler and more conveniently operated.

What we claim as our invention, and desire to secure by Letters Patent, is—

1. The combination, with the graduated scale-beam J, locked case A B $s'$, and beam H, or their equivalents, of the shelved bail or support E, independently-adjustable weights G $G^1$, and independently-adjustable levers $J^1$ $J^2$, substantially as and for the purpose described.

2. The standard $G^x$, with the weight-carrying levers $J^2$ attached to it, combined with the weighing apparatus herein described.

SYLVESTER C. BAKER.
JOSEPH ROOT.
EMERSON J. CASE.

Witnesses for ROOT and CASE:
  E. P. LYNES,
  JOHN S. FRANK.

Witnesses for S. C. BAKER:
  JOS. GRAHAM,
  H. T. McCLELLAND.